US009306251B2

(12) United States Patent
Inoue

(10) Patent No.: US 9,306,251 B2
(45) Date of Patent: Apr. 5, 2016

(54) BATTERY PACK

(71) Applicant: DENSO CORPORATION, Kariya, Aichi-pref. (JP)

(72) Inventor: Yoshimitsu Inoue, Chiryu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/704,361

(22) Filed: May 5, 2015

(65) Prior Publication Data

US 2015/0325891 A1 Nov. 12, 2015

(30) Foreign Application Priority Data

May 9, 2014 (JP) ................................. 2014-097929

(51) Int. Cl.
| | | |
|---|---|---|
| *B60K 11/04* | (2006.01) | |
| *H01M 10/625* | (2014.01) | |
| *H01M 10/6563* | (2014.01) | |
| *H01M 10/613* | (2014.01) | |
| *H01M 2/10* | (2006.01) | |
| *H01M 2/20* | (2006.01) | |
| *H01M 10/6556* | (2014.01) | |
| *B60K 1/04* | (2006.01) | |
| *B60K 1/00* | (2006.01) | |

(52) U.S. Cl.
CPC ............... *H01M 10/625* (2015.04); *B60K 1/04* (2013.01); *H01M 2/1083* (2013.01); *H01M 2/206* (2013.01); *H01M 10/613* (2015.04); *H01M 10/6556* (2015.04); *H01M 10/6563* (2015.04); *B60K 2001/005* (2013.01); *B60K 2001/0438* (2013.01); *H01M 2220/20* (2013.01)

(58) Field of Classification Search
CPC ................................ B60R 16/04; Y02E 60/12
See application file for complete search history.

(56) References Cited

U.S. PATENT DOCUMENTS

| | | | | |
|---|---|---|---|---|
| 7,964,300 | B2 * | 6/2011 | Nakazawa | .......... H01M 2/1016 |
| | | | | 429/53 |
| 2007/0040418 | A1 * | 2/2007 | Ohkuma | .................. B60K 1/04 |
| | | | | 297/15 |
| 2011/0159325 | A1 * | 6/2011 | Okuda | .................. B60L 3/0046 |
| | | | | 429/62 |
| 2014/0356660 | A1 | 12/2014 | Inoue | |
| 2015/0340745 | A1 | 11/2015 | Inoue | |

FOREIGN PATENT DOCUMENTS

| | | |
|---|---|---|
| JP | 2010-123298 | 6/2010 |
| JP | 2014-235899 | 12/2014 |
| JP | 2015-222701 | 12/2015 |

* cited by examiner

*Primary Examiner* — John Walters
*Assistant Examiner* — James Triggs
(74) *Attorney, Agent, or Firm* — Nixon & Vanderhye P.C.

(57) ABSTRACT

A battery pack includes batteries, a fan unit, a case housing the batteries and the fan unit, an air circulation passage formed in the case, an air introduction passage that makes communication between a suction part of the fan unit and outside of the case, and an air discharge passage that makes communication between the outside and an inside of the case. The air circulating passage includes a blow-off side passage that makes communication between a blowoff part of the fan unit and battery passages through which the circulating air flows to exchange heat with the batteries, and a suction side passage that makes communication between the battery passages and the suction part of the fan unit. At least one of the blow-off side passage and the suction side passage is an in-duct passage formed inside a duct disposed in the case.

7 Claims, 7 Drawing Sheets

BATTERY PACK

This application claims priority to Japanese Patent Application No. 2014-97929 filed on May 9, 2014, the entire contents of which are hereby incorporated by reference.

BACKGROUND OF THE INVENTION

1. Field of the Invention

The present invention relates to a battery pack capable of cooling battery cells housed in a case thereof.

2. Description of Related Art

Japanese Patent Application Laid-open No. 2010-123298 describes a battery pack having a structure in which a case housing battery cells is connected to a fan unit through a duct. In this battery pack, there is formed a circulation of the air which is blown out from the fan unit, distributed to the battery cells to exchange heat with them and then sucked into the fan unit.

However, the battery pack described in the above patent document has a problem in that since the air cooling the battery cells is circulated in a closed space, although noise can be suppressed from leaking to the outside, the cooling performance becomes insufficient when the ambient temperature is high because heat radiation to the outside is suppressed.

There is known a battery pack of the air supply/exhaust type having the structure in which the air taken into a case is supplied to battery cells, and is discharged to the outside after being increased in temperature due to heat exchange with the battery cells. However, the battery pack of this type has a technical challenge in that it is difficult to cool the battery cells evenly because there is difference in air distribution capacity among the battery cells depending on the air flow amount or the flow rate of the air circulating in the case.

SUMMARY

An exemplary embodiment provides a battery pack including:

batteries;

a fan unit for supplying air to cool the batteries;

a case housing the batteries and the fan unit;

a circulation passage formed in the case, the circulation passage forming a distribution channel into which the air blown out from the fan unit is sucked as circulating air after exchanging heat with the batteries;

an air introduction passage that makes communication between a suction part of the fan unit and outside of the case, the air introduction passage being always open when the circulating air is formed in the circulation passage; and an air discharge passage that makes communication between the outside and an inside of the case, the air discharge passage being always open when the circulating air is formed in the circulation passage so that part of the circulating air circulating through the circulation passage is discharged to the outside of the case as a result of external air outside the case being introduced into the case through the air introduction passage; wherein the air circulating passage includes a blow-off side passage that communicates between a blowoff part of the fan unit and battery passages through which the circulating air flows to exchange heat with the batteries, and a suction side passage that makes communication between the battery passages and the suction part of the fan unit, and at least one of the blow-off side passage and the suction side passage is an in-duct passage formed inside a duct disposed in the case.

According to the exemplary embodiment of the invention, there is provided a battery pack capable of suppressing noise leaked to the outside, and uniformly cooling batteries housed in its case.

Other advantages and features of the invention will become apparent from the following description including the drawings and claims.

PREFERRED EMBODIMENTS OF THE INVENTION

Figure 1:
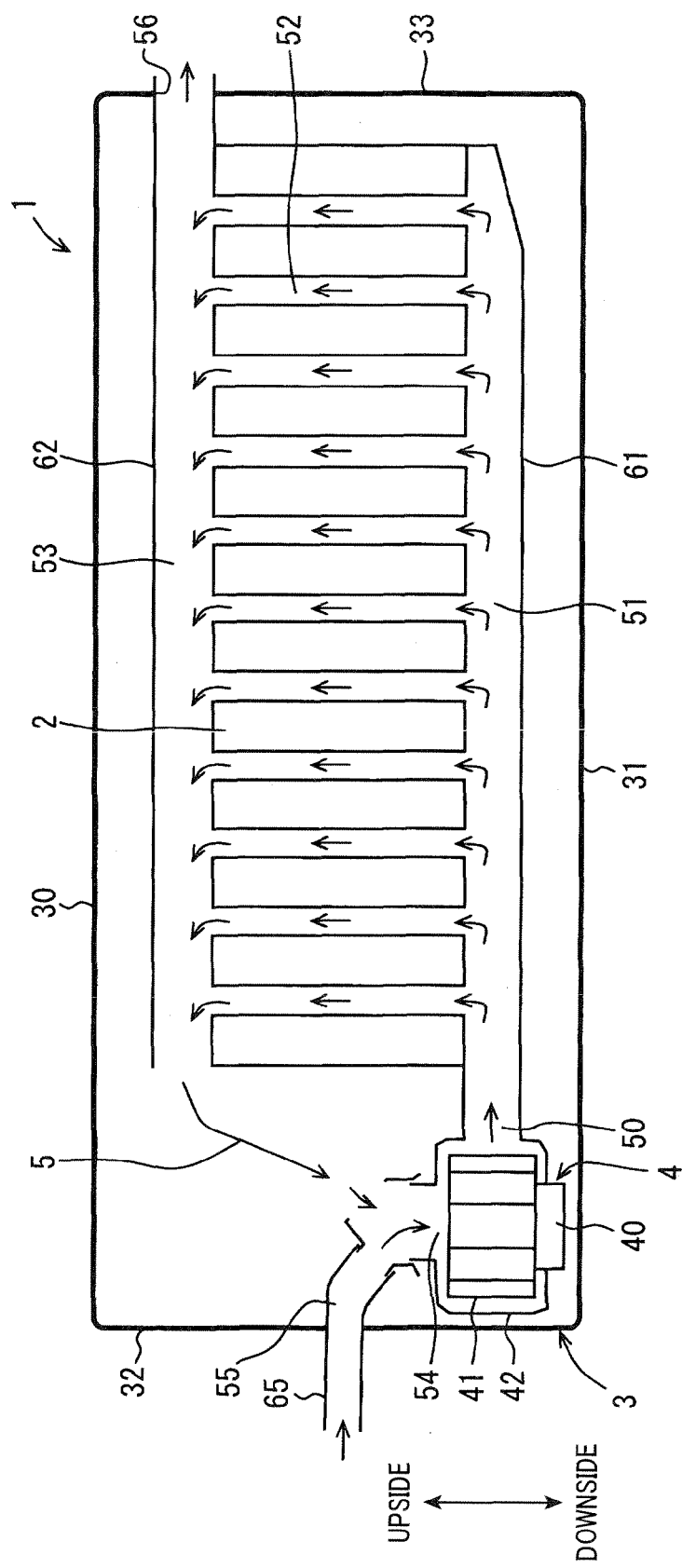
FIG. 1 is a diagram schematically showing a structure of a battery pack according to a first embodiment of the invention and flow of the air in a pack case thereof.

In the below described embodiments, the same or equivalent parts or members are indicated by the same reference numerals. Two or more of the embodiments may be combined partially when there is no apparent disadvantage in the combination.

First Embodiment

FIG. 1 is a diagram schematically showing a structure of a battery pack 1 according to a first embodiment of the invention and flow of the air in a pack case 3 of the battery pack 1. The battery pack 1 is used for a hybrid vehicle whose driving source is constituted of a combination of an internal combustion engine and an electric motor driven by electric power stored in a battery, an electric vehicle whose driving source is constituted of an electric motor and so forth. The battery pack 1 houses therein battery cells 2 such as nickel hydrogen rechargeable batteries, rechargeable lithium-ion batteries or organic radical batteries.

The battery pack 1 includes a battery assembly constituted of the battery cells 2, the pack case 3 and a fan 4 unit for circulating the air within the pack case 3. The pack case 3 houses therein the battery cells 2 and the fan unit 4.

Each of the battery cells 2 includes a positive terminal and a negative terminal as electrode terminals projecting to the outside from its outer case. The positive and negative terminals of each of the adjacent battery cells 2 are electrically connected through conductive members such as bus bars. The electrode terminals are connected to the bus bars by screw-fitting, welding or the like. A general terminal is disposed on both ends of the assembly of the battery cells 2 which are electrically connected through the bus bars or the like. The battery pack 1 is charged and discharged through the general terminals.

The battery pack 1 includes a battery management unit. The battery management unit is for performing control on the battery cells 2 including management of charge level of the battery cells 2. In this embodiment, the battery management unit is configured to monitor the current, voltage and temperature of the battery cells 2, and detect an abnormality, a short circuit and so on of the battery cells 2.

The battery management unit receives a signal indicating the current value measured by a current sensor. The battery management unit is implemented as an ECU including an input circuit, a microcomputer and an output circuit. The microcomputer includes a storage device for storing battery data. The battery data stored in the storage device includes data indicating the battery voltage, charge current, discharge current and temperature of the battery pack 1. The battery management unit can function as a control unit for controlling operation of a motor 40 of the fan unit 4. The battery management unit is capable of communicating with various electronic control units mounted on the vehicle.

The pack case 3 is formed therein with a circulation passage 5 through which the air is forcibly circulated by the fan unit 4. The circulation passage 5 serves as a main channel byway of which the air blown out from the fan unit 4 is sucked into the fan unit 4 after exchanging heat with the battery cells 2. The air within the pack case 3 flows out from the fan 4 unit at one place, and flows into the fan 4 unit at another one place. Accordingly, the air within the pack case 3 circulates through the circulation passage 5 always by way of the fan unit 4.

As shown in FIG. 1, the circulation passage 5 is constituted of a series connection of a blow-off passage 50, a blow-off side passage 51, battery passages 52, a suction-side passage 53 and a suction part 54 of the fan unit 4 which are connected in series. The blow-off passage 50 constitutes a blowoff part through which the air blown out from the fan 41 of the fan unit 4 passes.

The battery passages 52 are passages through which the air circulating through the circulation passage 5 flows to exchange heat with the battery cells 2. The blow-off side passage 51 is a passage that communicates the blow-off passage 50 and the battery passage 52s with each other, and is located upstream of the battery passages 52. The blow-off side passage 51 is formed on the side of a bottom wall 31. The suction-side passage 53 is a passage through which the air discharged from the blow-off passage 50 flows after exchanging heat with the battery cells 2 while passing through the battery passages 52. That is the suction-side passage 53 is a passage for communicating the battery passages 2 with the suction part 54 of the fan unit 4.

The blow-off side passage 51 is an in-duct passage formed inside a duct 61 disposed within the pack case 3. Accordingly, the passage extending from the blow-off passage 50 of the fan unit 4 passing the inlets of the battery passages 52 is a passage formed inside the duct 61 disposed within the pack case 3. The fan unit 4 and all the battery passages 52 are connected to each other through the duct 61. The blow-off side passage 51 is formed so as to extend along the bottom wall 31 covering the bottoms of the battery cells 2. Accordingly, the air blown out from the fan unit 4 is distributed to each of the battery passages 52 to cool the respective battery cells 2. In other words, the duct 61 is a duct connecting the blowoff part of the fan unit 4 to the upstream ends (bottom ends) of the respective battery cells 2. The duct 61 serves as a distribution passage for distributing the air blown out from the fan unit 4 to the respective battery passages 52.

The pack case 3, which is formed in a box shape having walls surrounding the inner space thereof, is molded of an aluminum plate or a steel plate. In this embodiment, the pack case 3 includes six walls (side walls 32 and 33, a top wall 30 and the bottom wall 31). There are two pairs of the side walls (one pair being side wall 32 and 33) opposite to each other. The top wall 30 and the bottom wall 31 are opposite to each other, and perpendicular to the two pairs of the side walls.

The pack case 3 can be manufactured by joining and assembling a plurality of case bodies to one another so as to form therein a box shape space. At least one of the walls of the pack case 3 may be formed with projections or depressions to increase its surface area as a heat dissipation surface.

The battery cells 2 constitute cell stack bodies. The battery cells 2 of each cell stack body are arranged at even intervals. Between each adjacent battery cells 2, the battery passage 52 is formed. The battery passage 52 is formed of a spacer member disposed between the adjacent cells. The spacer member is held and supported between the cells such that a passage through which fluid flows is formed between the adjacent cells. That is, each battery passage 52 is closed at the side of the side walls, opens to the blow-off side passage 51 at the side of the bottom wall 31, and communicates with the suction side passage 53 at the side of the top wall 30 between the adjacent cells. Accordingly, each battery passage 52 includes an inlet for an air flow at the side of the bottom wall 31, and includes an outlet for an air flow toward the suction side passage 53 at the side of the top wall 30.

The suction side passage 53 extends along the top wall 30 passing the outlets of the battery passages 52 so as to cover the tops of the battery cells 2. The suction side passage 53 is formed of a duct 62 covering the top plates of the battery cells 62. The air flowing out from the suction side passage 53 located above the battery cells 2 exits from the inside of the duct 62, flows in the inner space surrounded by the walls of the pack case 3, and then sucked into the suction part 54 of the fan unit 4. Accordingly, the duct 62 and suction part 54 are not directly connected to each other, but the inner space surrounded by the walls of the pack case 3 is present between them.

The fan unit 4 includes the motor 40, the fan 41 of the centrifugal type driven by the motor 40, and a casing 42 housing the fan 41. The casing 42 is formed with the suction part 54 leading to a suction opening of the fan 41.

The fan unit 4 is disposed such that the rotation axis of the fan 41 is perpendicular to the top wall 30 and the bottom wall 31 so as to suck fluid along the rotation axis and blow out the fluid in the centrifugal direction. In this embodiment, the fan unit 4 is disposed with the side of the motor 40, that is, its back side opposite to the suction part 54 facing the bottom wall 31.

The blowoff part of the casing 42 is connected with the duct 61. The blow-off passage 50 of the fan unit 4 extends along the bottom wall 31 in the centrifugal direction of the fan 41. Accordingly, the air blown out from the blow-off passage 50 by the fan unit 4 moves through the blow-off side passage 51 surrounded by the duct 61, and is distributed to the respective battery passages 52. Thereafter, the air flows above the battery passages 52 by being sucked by the fan unit 4, flows into the suction side passage 53, and returns to the fan unit 4 by way of the suction part 54.

The air flowing through the circulation passage 5 absorbs the heat of the battery cells 2 or heats the battery cells 2 while passing through the battery passages 52. The air that has cooled or heated the battery cells 2 is collected to the suction side passage 53, and sucked into the fan unit 4 through the suction part 54. Since the air circulating through the circulation passage 5 contacts the positive and negative terminals of the battery cells 2 and the bus bars connecting these terminals, these terminals and the bus bars constitute a heat transfer means.

The battery cells 2 generate heat when being charged or discharged. In this embodiment, the battery management unit always monitors the temperature of the battery cells 2 within the battery pack 1, and controls the operation of the fan unit 4 in accordance with the temperature of the battery cells 2. When the temperature of the battery cells 2 is low and satisfies a battery cooling condition (for example, when the temperature of the battery cells 2 is lower than 40 degrees C.), the battery management unit controls the fan unit 4 to operate. As a result, an air flow circulating through the circulation passage 5 is formed within the pack case 3. At this time, external air flows into the pack case 3 through an air introduction passage 55, flows out from the battery passages 52 and then is discharged from an air discharge passage 56. Accordingly, in the pack case 3, there are formed a circulation flow of the air and a supply/discharge flow of the air.

The battery management unit controls the duty ratio in a range from 0 to 100% of a voltage applied to the motor 40 to control the rotational speed of the fan 41. By this duty control, the air flow amount of the fan unit 4 can be adjusted stepwise or non-stepwise.

The battery pack 1 includes the air introduction passage 55 for introducing the external air sucked by the fan unit 4 into the pack case 3. The air introduction passage 55 is a passage formed inside an introduction duct 65 connected to the suction side of the casing 42. The introduction duct 65 is formed such that it penetrates through the side wall 32 and its open end is located outside the pack case 3. The introduction duct 65 connects the suction part 54 located above the fan unit 4 to the outside of the pack case 3. Accordingly, the air introduction passage 55 leads to the outside of the pack case 3, and the external air outside the pack case 3 is sucked into the suction part 54 through the air introduction passage 55 by the fan unit 4.

The air sucked into the fan unit 4 includes the external air that has passed through the air introduction passage 55 and the air flowing from the suction side passage 53. Accordingly, the suction part 54 of the fan unit 4 communicates with both the outside and the inside of the pack case 3 so that it can take in the air from both of them. The external air sucked into the introduction duct 65 by the fan unit 4 is introduced to the suction part 54 of the fan unit 4 through the air introduction passage 55. This air is blown out from the blow-off passage 50 and taken in the pack case 3 after flowing through the circulation passage 5.

The air introduction passage 55 is smaller in cross-sectional area than the suction part 54 and the suction side passage 53. Accordingly, the amount of air taken in from the outside of the pack case 3 is smaller than the amount of air sucked from the suction side passage 53.

The air introduction passage 55 is disposed downstream of the battery passages 52, and can be connected to a specific portion located in an area upstream of the suction part 54 of the fan unit 4. Accordingly, the specific portion can be set at any position in an area including the suction side passage 53 and the casing 42. As explained above, the air introduction passage 55 can mix the circulating air that has increased in temperature by heat exchange with the battery cells 2 with the external air by being connected to the specific portion. This makes it possible to reduce the temperature of the air that should exchange heat with the battery cells 2.

The battery pack 1 includes the air discharge passage 56 penetrating through the wall forming the pack case 3, part of the air discharged from the fan unit 4 passing through the discharge passage 56 to leak from the inside of the pack case 3 to the outside. The air discharge passage 56 penetrates through the side wall 33 to make communication between the outside and inside of the pack case 3, and is connected to the suction side passage 53. Accordingly, the air circulating through the circulation passage 5 is partially discharged to the outside after exiting from the battery passages 52 by the same amount of the air taken in from the air introduction passage 55, the remaining part of the air being sucked into the suction part 54.

The air introduction passage 55 and the air discharge passage 56 are always open when there is an air circulation in the circulation passage 5. Accordingly, as long as the air circulates in the pack case 3, supply and discharge of a small amount of air appropriate to the amount of the circulating air is performed. That is, when the fan unit 4 is stopped and no air circulation is present, the air introduction passage 55 and the air discharge passage 56 may be either closed or open.

The battery pack 1 is installed in a pack housing space provided in the trunk area of the vehicle or in the trunk/back area located below the trunk area. A spare tire and tools can be housed also in the pack housing space.

The battery pack 1 is installed in the pack housing space with its bottom wall 31 or blow-off side passage 51 facing downward. The air introduction passage 55 leads to the cabin of the vehicle. The introduction duct 65 extends such that its air suction part is located in the cabin. The introduction duct 65 is disposed so as to penetrate through the interior material of the cabin to lead to the cabin, or be laid along a side of the cabin. Accordingly, the air which the fan unit 4 sucks through the air introduction passage 55 is the air inside the cabin 90.

When an air-conditioning unit for air-conditioning the cabin is provided in the vehicle, the air-conditioning unit takes in the air from outside the vehicle or inside the cabin, and supplies the temperature-controlled air to the cabin. Accordingly, in this case, the air introduction passage 55 enables introduction of the external air or the air inside the cabin whose temperature is lower than the ambient temperature of the pack case 3 into the pack cabin 3.

The pack case 3 may be installed in the vehicle so as to be in contact with the floor of the vehicle so that the heat within the pack case 3 can be transmitted to the floor through its walls. A heat dissipation sheet may be interposed between the bottom wall 31 and the floor of the vehicle so that the heat within the pack case 3 can be transmitted to the floor from the bottom wall 31 through the heat dissipation sheet.

Next, advantages provided by the battery pack 1 according to the first embodiment of the invention are explained. The battery pack 1 includes the air introduction passage 55 which makes communication between the outside of the pack case 3 and the suction part 54 of the fan unit 4, and the air discharge passage 56 through which part of the circulating air is discharged to the outside of the pack case 3 as a result of the air outside the pack case 3 being introduced into the pack case 3 through the air introduction passage 55. The blow-off side passage 51 is an in-duct passage formed inside the duct 61 disposed within the pack case 3.

According to this configuration, since the circulating air is a main stream within the pack case 3, it is possible to reduce dispersion in air supply amount which depends on the air flow amount among the battery cells 2, to thereby improve the distributivity of the cooling air to the battery cells 2 compared to conventional battery packs. By improving the distributivity of the cooling air to the battery cells 2, the temperature distribution among them can be uniformed. In addition, since the circulating air is a main stream within the pack case 3, noise leakage to the outside can be suppressed compared to conventional battery packs in which a large amount of air is discharged and taken in.

Further, since part of the main stream is discharged to be exchanged with the external air, the circulating air whose temperature has increased after heat exchange with the battery cells 2 can be mixed with the external air to reduce its temperature to thereby increase the heat absorption effect. Further, when the ambient temperature is high, since the battery cells 2 can be cooled only by the circulating air while discharging part of it to remove the high-temperature air from the pack case 3, it is possible to suppress reduction of the capacity of the heat dissipation through the pack case 3.

Since the suction part 54 of the fan unit 4 is a part of the circulation passage 5, and communicates with the outside of the pack case 3 through the air introduction passage 55, the suction part 54 can communicate with both the outside and inside of the pack case 3.

The air introduction passage 55 is disposed so as to communicate with the cabin of the vehicle. The air inside the cabin is sucked into the pack case 3 through the air introduction passage 55. Since the air inside the cabin being air-conditioned can be introduced into the pack case 3 through the air introduction part 55, it is possible to increase the temperature difference between the air inside the pack case 3 and the air discharged from the air discharge passage 56. Accordingly, since the amount of heat dissipated to the outside can be increased, the cooling performance of the battery pack 1 can be further increased.

Second Embodiment

Figure 2:
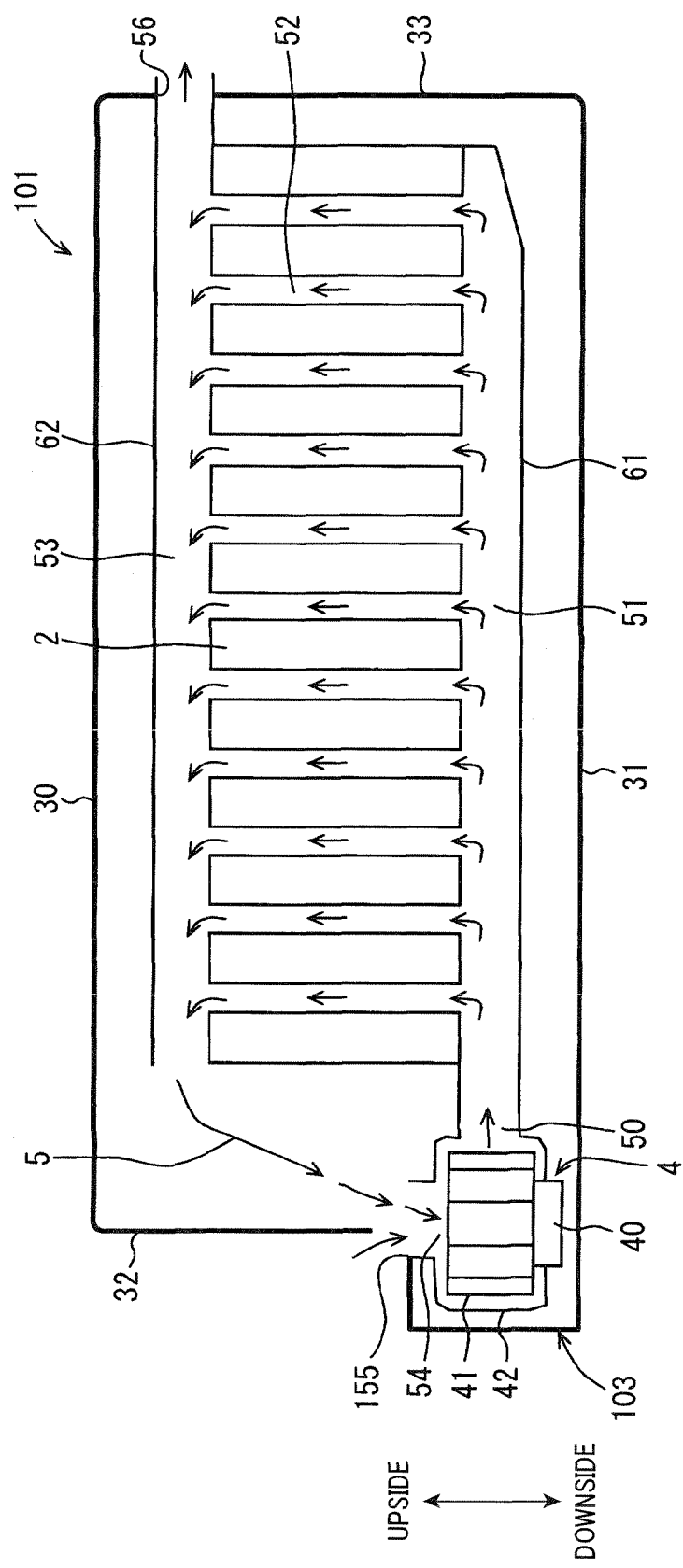
FIG. 2 is a diagram schematically showing a structure of a battery pack according to a second embodiment of the invention and flow of the air in a pack case thereof.

Next, a second embodiment of the invention is described with a focus on differences with the first embodiment with reference to FIG. 2.

As shown in FIG. 2, a battery pack 101 according to the second embodiment of the invention includes an air introduction opening as an air introduction passage 155 formed in a pack case 103. Accordingly, the suction part 54 of the fan unit 4 is located at a position facing both the air introduction opening which opens to the pack case 103 and the inner space surrounded by the pack case 103. Since any introduction duct for forming the air introduction passage 155 is not necessary, and accordingly, the parts count and the size of the battery pack 101 can be reduced, it is possible to ease the condition of installation of the battery pack 101.

Further, since the suction part 54 of the fan unit 4 is a part of the circulation passage 5 and communicates with the outside of the pack case 103 through the air introduction part 155, the suction part 54 can communicate with both the outside and inside of the pack case 103.

Third Embodiment

Figure 3:
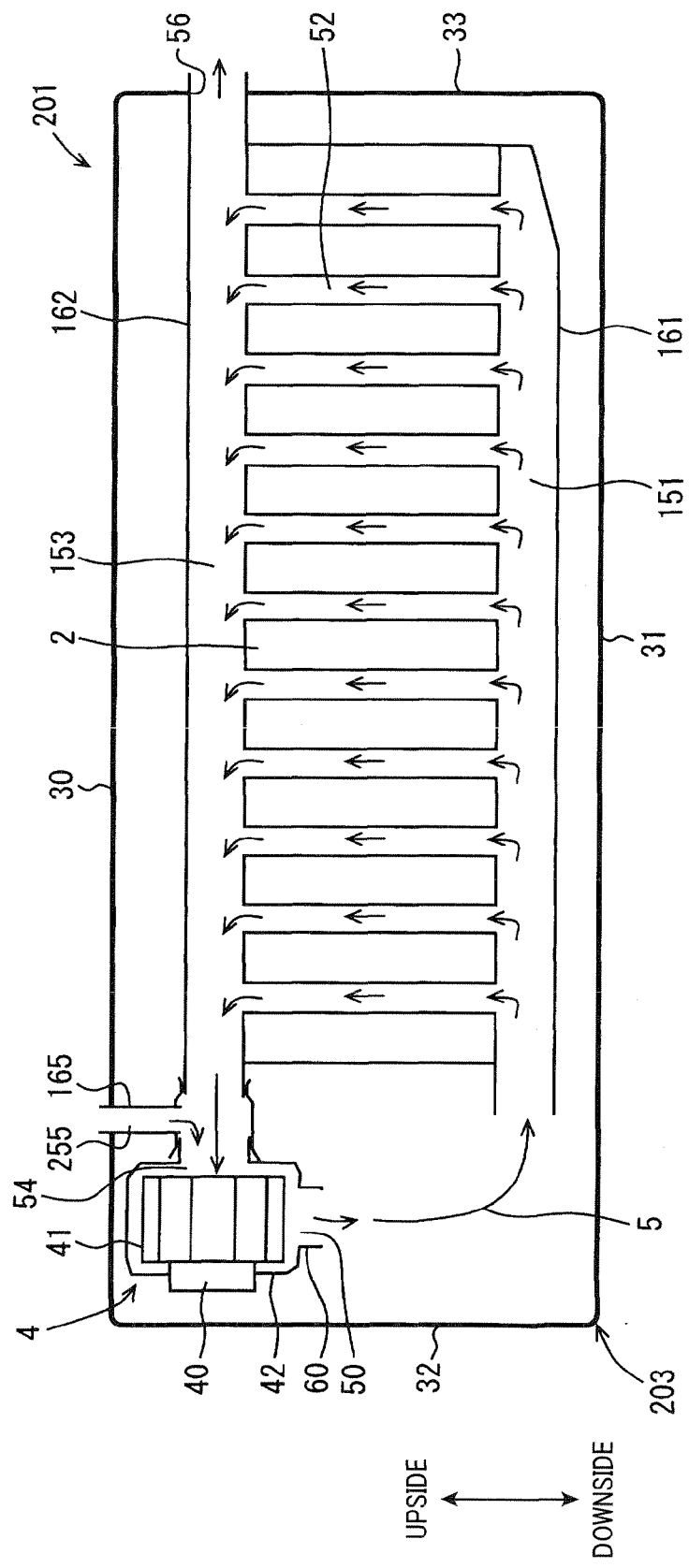
FIG. 3 is a diagram schematically showing a structure of a battery pack according to a third embodiment of the invention and flow of the air in a pack case thereof.

Next, a third embodiment of the invention is described with a focus on differences with the first embodiment with reference to FIG. 3.

As shown in FIG. 3, a battery pack 201 according to the third embodiment of the invention includes a suction side passage 153 which extends along the top wall 30 passing the outlets of the battery passages 52 so as to cover the tops of the battery cells 2. The suction side passage 153 is an in-duct passage formed inside a duct 162 disposed in a pack case 203. That is, the passage extending to the suction part 54 of the fan unit 4 passing the outlets of the battery passages 2 is a passage formed inside the duct 162 disposed within the pack case 3. The suction part 54 of the casing 42 is connected to all the battery cells 2 through the duct 162. The duct 162 constitutes an in-duct collection passage to which the air flowing out from the battery passages 52 2 is collected.

An air introduction passage 255 is formed inside an introduction duct 165 connected to the suction side of the casing 42. The introduction duct 165 is disposed such that it penetrates through the top wall 30 and its open end is located outside the pack case 3. The introduction duct 165 connects the suction part 54 of the fan unit 4 to the outside of the pack case 203. Accordingly, the air introduction passage 255 leads to the outside of the pack case 203, and the external air sucked by the fan unit 4 is taken into the suction part 54 through the air introduction passage 255.

A blow-off side passage 151 extends along the bottom wall 31 so as to cover the bottoms of the battery cells 2. The blow-off side passage 151 is constituted of a duct 161 that covers the bottom surfaces of the battery cells 2. The air blown downward from the blow-off passage 50 of the fan unit 4 flows in the inner space surrounded by the walls of the pack case 203, and then flows into the blow-off side passage 151 located below the battery cells 2. Accordingly, the duct 161 and the casing 42 are not directly connected to each other, but the inner space surrounded by the case walls is present between them. The air blown out from the fan unit 4 is distributed to all the battery passages 52 to cool the battery cells 2.

This air flows above the battery cells 2 by being sucked by the fan unit 4 to absorb heat from the battery cells 2, and flows to the suction side passage 53 surrounded by the duct 162 from above the battery cells 2. Thereafter, this air is sucked into the suction part 54 of the fan unit 4 without leaking to the outside.

The air sucked into the fan unit 4 is a mixture of the external air having flowed through the air introduction passage 255 and the air flowing out from the suction side passage 153. Accordingly, since the suction part 54 of the fan unit 4 communicates with both the outside of the pack case 203 and the inside of the duct 162, it can take in the air from both of them. The external air sucked into the introduction duct 165 by the fan unit 4 is introduced into the suction part 54 of the fan unit 4 through the air introduction passage 255. This air is blown out from the blow-off passage 50, flows through the circulation passage 5 and taken in the pack case 203.

In the third embodiment, the suction side passage 153 is an in-duct passage formed inside the duct 162 disposed within the pack case 203. According to this configuration, since the suction side passage 153 making communication between the suction part 54 of the fan unit 4 and the outlets of the battery passages 52 is surrounded by the duct 162, the passage under static pressure downstream of the battery passages 2 makes a passage isolated from its circumference. Accordingly, since the pressure dispersion among the outlets of the respective battery cells 52 can be suppressed, the wind velocities at the respective battery passages can be made uniform to thereby cool the battery cells uniformly.

Fourth Embodiment

Figure 4:
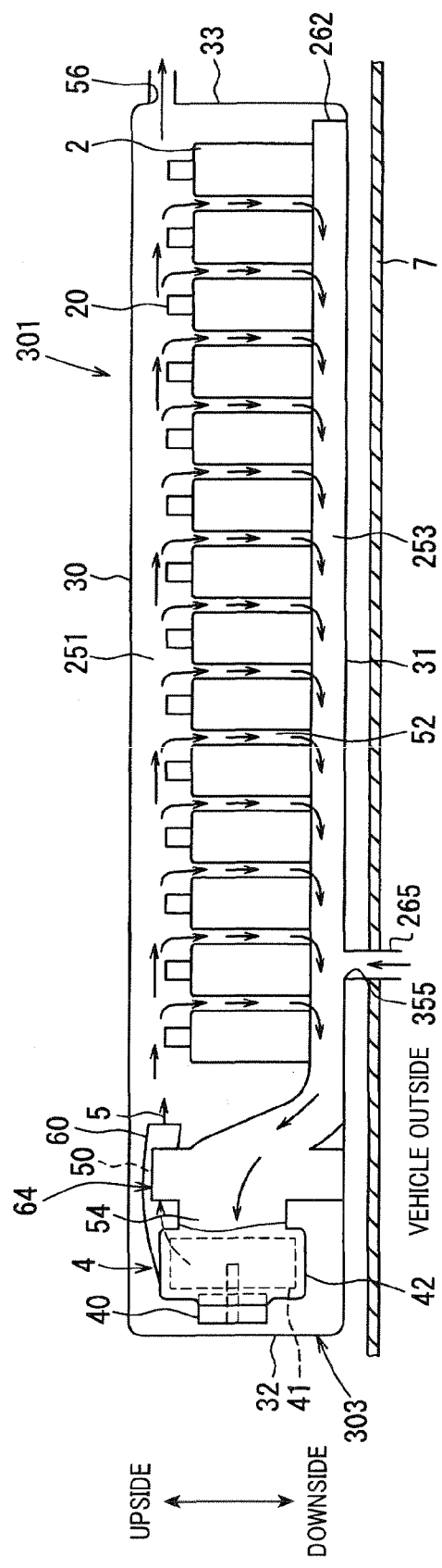
FIG. 4 is a diagram schematically showing a structure of a battery pack according to a fourth embodiment of the invention and flow of the air in a pack case thereof.

Next, a fourth embodiment of the invention is described with a focus on differences with the first embodiment with reference to FIG. 4.

As shown in FIG. 4, a battery pack 301 according to the fourth embodiment of the invention includes an air introduction passage 355 formed of an introduction duct 265 disposed on the bottom wall 31. The air introduction passage 355 is connected to an suction side passage 253 formed inside the duct 62. The suction side passage 253 is an in-duct passage formed inside the introduction duct 265 disposed within a pack case 303. The introduction duct 265 is disposed so as to extend downward from the connection portion with the bottom wall 31, penetrate through the floor 7 of the vehicle with its open end being located outside the vehicle.

Since an air circulation flow is formed within the pack case 303 by the fan unit 4, the air present in the vicinity of a connection portion between the air introduction passage 355 and the suction side passage 253 is sucked into the circulation passage 5. As a result, the external air enters the circulation passage 5 from the suction side passage 253 through the air introduction passage 55. The external air having entered the circulation passage 5 circulates through the circulation passage 5 together with the circulating air. Part of the circulating air is discharged to the outside from the air discharge passage 56 by an amount equivalent to the amount of the external air that has entered the circulation passage 5.

The pack case 303 may be installed so as to be in direct contact with the floor 7 of the vehicle. Since the floor 7 of the vehicle is frequently cooled by the air-conditioned air, and is hardly exposed to direct sun light, its temperature is relatively low. Accordingly, when the pack case 303 is in direct contact with the floor 7 of the vehicle, the pack case 303 can provide a heat dissipation effect through its walls. Also, the pack case 303 may be installed on the floor 7 through a bracket member with the bottom wall 31 being suspended from the floor 7.

The suction part 54 of the fan unit 4 and the suction side passage 253 are connected to each other by a duct connection member 64 to communicate with each other. The duct connection member is an attachment joining the casing 42 to the duct 262. The duct connection member 64 includes a rectangular chamber thereinside. Accordingly, the duct connection member 64 contributes to reduce the flow resistance of a circulating fluid.

The blowoff part of the casing 42 is connected with a blow-off duct 60 which constitutes the blow-off passage 50.

The blow-off passage 50 extends in the centrifugal direction of the fan 41, and further extends along the top wall 30. Accordingly, the air blown out from the blow-off passage 50 by the fan unit 40 flows through a blow-off side passage 251 along the top wall 30, and then flows toward the battery passages 52 from the blow-off side passages 251. Thereafter, the air flows downward to enter the battery passages 52 by being sucked by the fan unit 4, flows into the suction side passage 253 from the bottoms of the battery passages 52, and returns to the fan unit 4 by way of the suction part 54.

The air circulating through the circulation passage 5 contacts the top wall 30 and the side walls. The circulating air dissipates heat to the outside of the pack case 303 through the side walls and the top wall 30 before exchanging heat with the battery cells 2. Also, the circulating air dissipates heat to the outside of the pack case 303 through the top wall 30 while flowing through the blow-off side passage 251 immediately before exchanging heat with the battery cells 2. Accordingly, the whole of the top wall 30 and the whole of the side walls perpendicular to the top wall 30 serve as a heat dissipation surface for dissipating the heat of the battery cells 2 housed in the pack case 303.

The pack case 303 of the battery pack 301 is mounted on the vehicle. The introduction duct 265 forming the air introduction passage 355 is disposed so as to extend to the outside of the vehicle below the floor 7 of the vehicle. The battery pack 301 can take in the air outside the vehicle from a position below the floor 7 of the vehicle. Since the space below the floor 7 of vehicle is shaded the temperature of the air below the floor 7 is relatively low. Accordingly, by taking the air into the suction side passage 253 from below the floor 7, the temperature of the air having exchanged heat with the battery cells 2 can be reduced effectively.

The battery cells 2 are disposed with their electrode terminals 20 facing upward. The air blown out from the fan unit 4 passes the electrode terminals 20 and enters the battery passages 52. According to this configuration, it is possible that the electrode terminals 20 generating a large amount of heat are cooled, and then the outer cases of the battery cells 2 are cooled.

Further, since the suction part 54 of the fan unit 4 is a part of the circulation passage 5 and communicates with the outside of the pack case 303 through the air introduction part 355, the suction part 54 can communicate with both the outside and inside of the pack case 303.

Fifth Embodiment

Figure 5:
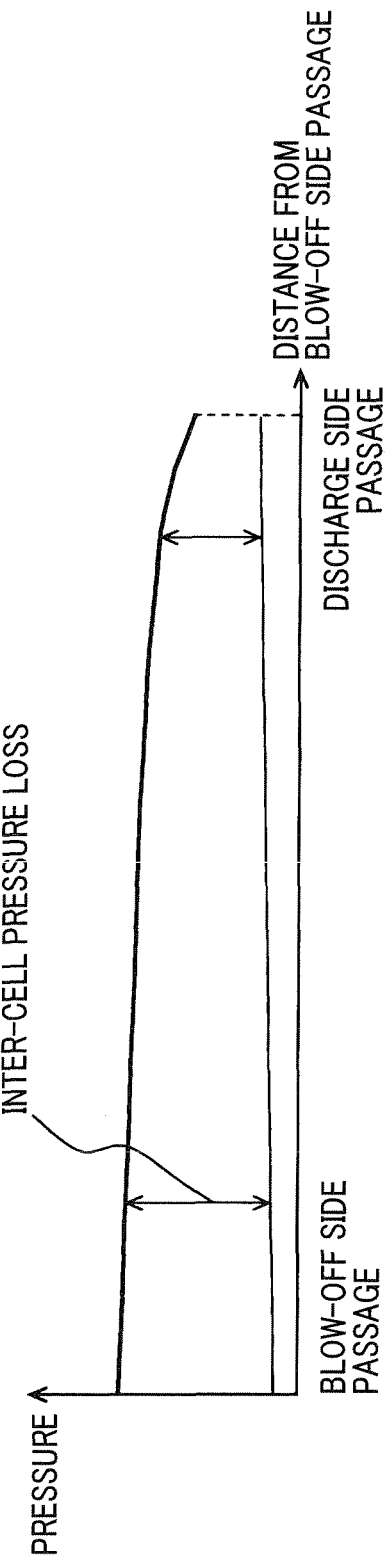
FIG. 5 is a diagram for explaining a pressure state in the pack case of the battery pack according to the fourth embodiment.
Figure 6:
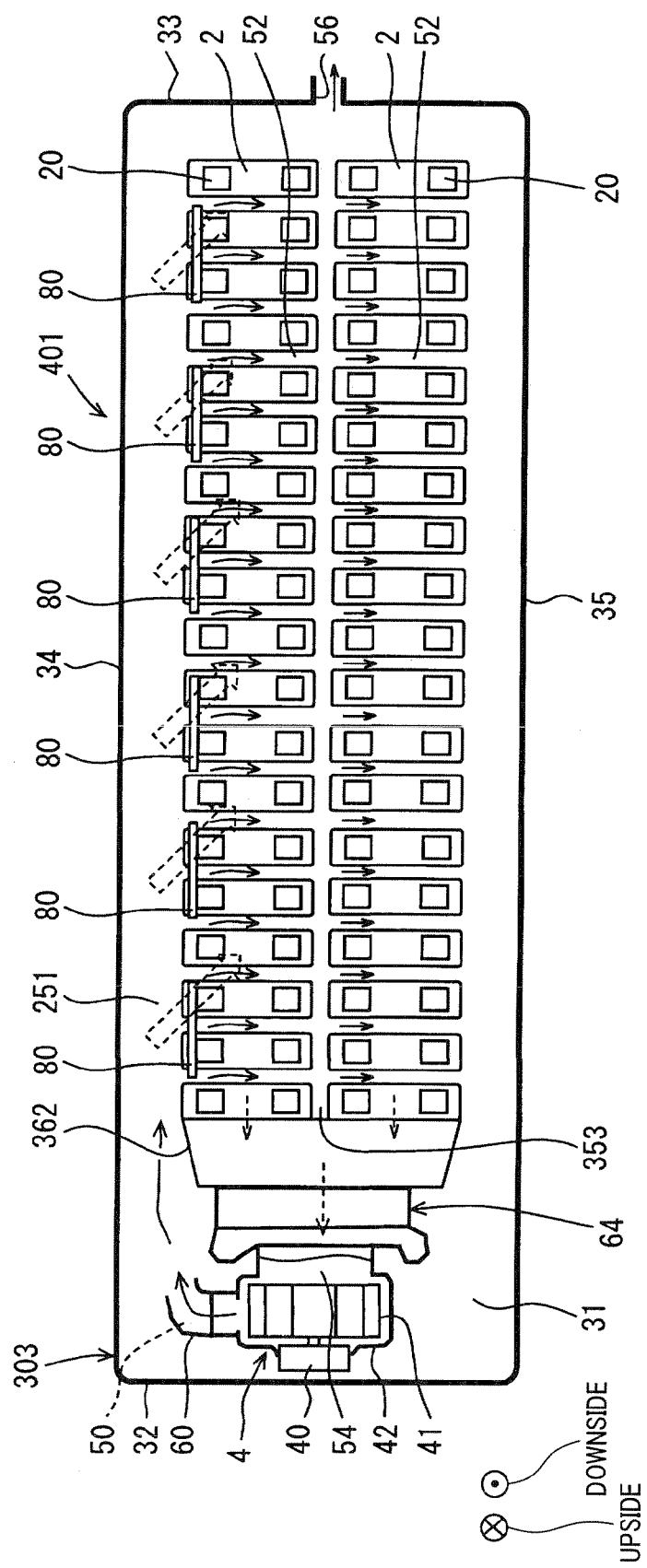
FIG. 6 is a diagram schematically showing a structure of a battery pack according to a fifth embodiment of the invention and flow of the air in a pack case thereof.
Figure 7:
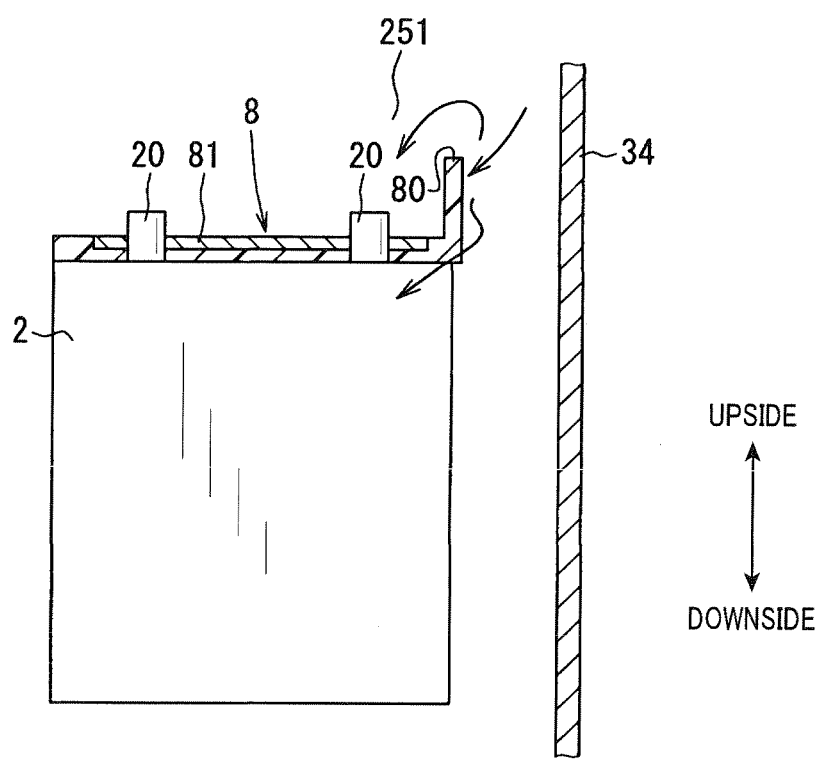
FIG. 7 is a diagram for explaining the structure of air flow diffusion members provided in the battery pack according to the fifth embodiment of the invention.

Next, a fifth embodiment of the invention is described with a focus on differences with the first and fourth embodiments with reference to FIGS. 5 to 7.

FIG. 5 is a diagram for explaining a pressure state in the pack case of the battery pack 301 according to the fourth embodiment. As shown in FIG. 5, the pressure in the blow-off passage 251 decreases with the distance from the blow-off passage 50 of the fan unit 4 in the cell stacking direction. That is, the pressures at the inlets of the battery passage 52 decrease with the distance from the blow-off passage 50, and accordingly the battery passage 52 closest to the air discharge passage 56 is the lowest in inlet pressure of all the battery passages 52.

Accordingly, the differences in pressure loss among the inter-cell passages, or among the battery passages 52 are large. For example, the difference between the pressure loss in the inter-cell passage closest to the blow-off passage 50 and the pressure loss in the inter-cell passage most distant from the blow-off passage 50 is large. As a result, since the differences in air flow amount and air flow velocity are also large, the coolability differences among the battery cells 2 are large. In addition, the air flow velocity in the inter-cell passage is reduced at a position closest to the air discharge passage 56 because of the effect of the air flowing above the battery cells 2 toward the air discharge passage 56, for example, by the diffuser effect.

The battery pack 401 according to the fifth embodiment is designed to ease such disadvantageous points. In this embodiment, the air blown out from the blow-off passage 50 of the fan unit 4 flows toward the side wall 33 along the side walls 34 and 35. This air tends to move in the direction shown by the broken arrows shown in FIG. 6 due to the pressure loss difference when flowing upward. This causes coolability differences among the battery cells 2, and cause a reduction of the air flow velocity in the vicinity of the air discharge passage 56 due to the diffuser effect.

Accordingly, the battery pack 401 is provided with diffusion members 80 disposed in the blow-off side passage 251. The air flowing toward the battery passages 52 collides with the diffusion members 80 to be diffused. Each diffusion member 80 is located on the side of the side wall 34 of the battery passage 2 such that its top end is above the battery cell 2. The diffusion members 80 have a plate-like shape and are arranged in the cel 1 stacking direction. The air moving toward the battery passages 52 and colliding with the diffusion member 80 flows to both sides of the diffusion member 80 or flows over the diffusion member 80 to be diffused before flowing into the battery passage 52.

The provision of the diffusion members 80 makes it possible to diffuse the air blown out form the fan unit 4 and moving toward the battery passages 52, to thereby reduce the coolability differences among the battery cells 2.

It is preferable that the diffusion member 80 is provided integrally with a bus bar module 8 which supports the bus bar 81 electrically connecting the electrode terminals 20 of the adjacent battery cells 2 as shown in FIG. 7. The diffusion member 80 is located on the side of the side wall 34 in the bas bar module 8, and has such a vertical length as to project upward from the electrode terminals 20. The bus bar module 8 is made of resin so that it can be formed integrally with the diffusion member 80. The bus bar 81 having electrical conductivity can be formed integrally with the bus bar module 8 by insert molding.

The diffusion member 80 may be constituted of a signal or plural walls within the pack case 303.

Other Embodiments

It is a matter of course that various modifications can be made to the above embodiments as described below.

In the above embodiments, one of the blow-off side passage and the suction side passage is an in-duct passage formed inside the duct disposed within the case body. However, both of them may be an in-duct passage.

The above embodiments does not include any open/close device for opening and closing the air introduction passage 55 or air discharge passage 56. However, these passages may be provided with an opening/closing device.

In the above embodiments, the air discharge passage 56 can be disposed at an arbitrary position within the side wall 33 or the top wall 30.

Each of the above embodiments may be provided with an opening/closing device for closing at least one of the air introduction passage and the air discharge passage when the fan unit 4 is out of operation, and opening both of them when the fan unit 4 is in operation.

In each of the above embodiments, the air discharge passage 56 penetrating through the pack case is not limited to one in number. The air discharge passage 56 may be provided for each of two or more of the walls so as to penetrate therethrough.

In the above embodiments, the circulation flow whose main stream is along the circulation passage 5 is generated by the single fan unit 4. However, the circulation flow may be generated by two or more fan units.

In the above embodiments, the fan 41 of the fan unit 4 is a sirocco fan. However, the fan 41 may be an axial fan or a turbofan.

The above explained preferred embodiments are exemplary of the invention of the present application which is described solely by the claims appended below. It should be understood that modifications of the preferred embodiments may be made as would occur to one of skill in the art.

What is claimed is:

1. A battery pack comprising:
   batteries;
   a fan unit for supplying air to cool the batteries;
   a case housing the batteries and the fan unit;
   a circulation passage formed in the case, the circulation passage forming a distribution channel into which the air blown out from the fan unit is sucked as a circulating air after exchanging heat with the batteries;
   an air introduction passage that makes communication between a suction part of the fan unit and outside of the case, the air introduction passage being always open when the circulating air is formed in the circulation passage; and
   an air discharge passage that makes communication between the outside and an inside of the case, the air discharge passage being always open when the circulating air is formed in the circulation passage so that part of the circulating air circulating through the circulation passage is discharged to the outside of the case as a result of external air outside the case being introduced into the case through the air introduction passage; wherein
   the air circulating passage includes a blow-off side passage that makes communication between a blowoff part of the fan unit and battery passages through which the circulating air flows to exchange heat with the batteries, and a suction side passage that makes communication between the battery passages and the suction part of the fan unit, and
   at least one of the blow-off side passage and the suction side passage is an in-duct passage formed inside a duct disposed in the case.

2. The battery pack according to claim 1, wherein the suction side passage is an in-duct passage formed inside the duct disposed in the case.

3. The battery pack according to claim 1, wherein the air introduction passage is formed of an air introduction opening formed in the case.

4. The battery pack according to claim 1, wherein the air introduction passage is a passage formed of a duct which penetrates through the case.

5. The battery pack according to claim 1, wherein the blow-off side passage is provided with diffusion members with which the air flowing toward the battery passages collides to be diffused.

6. The battery pack according to claim 5, wherein each diffusion member is integrally formed with a bus bar module which supports a bus bar making electrical connection between electrode terminals of each adjacent batteries.

7. The battery pack according to claim 4, wherein the case is mounted on a vehicle, and the duct forming the air introduction passage extends to a space outside the vehicle and below a floor of the vehicle.

* * * * *